US012627460B2

(12) United States Patent
Wasko et al.

(10) Patent No.: US 12,627,460 B2
(45) Date of Patent: May 12, 2026

(54) CLOCK SYNCHRONIZATION BETWEEN NETWORKED DEVICES BASED ON PACKET CONGESTION INFORMATION

(71) Applicant: Mellanox Technologies, Ltd., Yokneam (IL)

(72) Inventors: Wojciech Wasko, Mlynek (PL); Dotan David Levi, Kiryat Motzkin (IL); Thomas Kernen, Geneva (CH)

(73) Assignee: Mellanox Technologies, Ltd., Yokneam (IL)

( * ) Notice: Subject to any disclaimer, the term of this patent is extended or adjusted under 35 U.S.C. 154(b) by 254 days.

(21) Appl. No.: 18/219,895

(22) Filed: Jul. 10, 2023

(65) Prior Publication Data

US 2025/0023705 A1 Jan. 16, 2025

(51) Int. Cl.
H04L 7/00 (2006.01)

(52) U.S. Cl.
CPC .......... H04L 7/0033 (2013.01); H04L 7/0079 (2013.01)

(58) Field of Classification Search
CPC ..... H04L 27/26; H04L 7/0033; H04L 7/0079; H04L 7/00; H04J 3/06; H04J 3/0667; H04W 56/00
See application file for complete search history.

(56) References Cited

U.S. PATENT DOCUMENTS

| | | | | |
|---|---|---|---|---|
| 2021/0288784 A1* | 9/2021 | Neugeboren | ......... | H04J 3/0667 |
| 2024/0380507 A1* | 11/2024 | Kurata | ................ | H04L 43/0864 |
| 2024/0413921 A1* | 12/2024 | Wang | ................... | H04J 3/0667 |

* cited by examiner

*Primary Examiner* — Iqbal Zaidi
(74) *Attorney, Agent, or Firm* — Lowenstein Sandler LLP

(57) ABSTRACT

A network device includes control logic coupled to a receiver. The control logic detects an synchronization packet received via the receiver from a second network device over a network that is precision time protocol unaware. The control logic determines that a portion of the synchronization packet is asserted, indicating that the synchronization packet has incurred congestion traversing the network. The control logic adjusts, based on an assertion of the portion, a weight applied to timestamps associated with sending and receiving the synchronization packet in performing clock synchronization with the second network device.

20 Claims, 5 Drawing Sheets

200

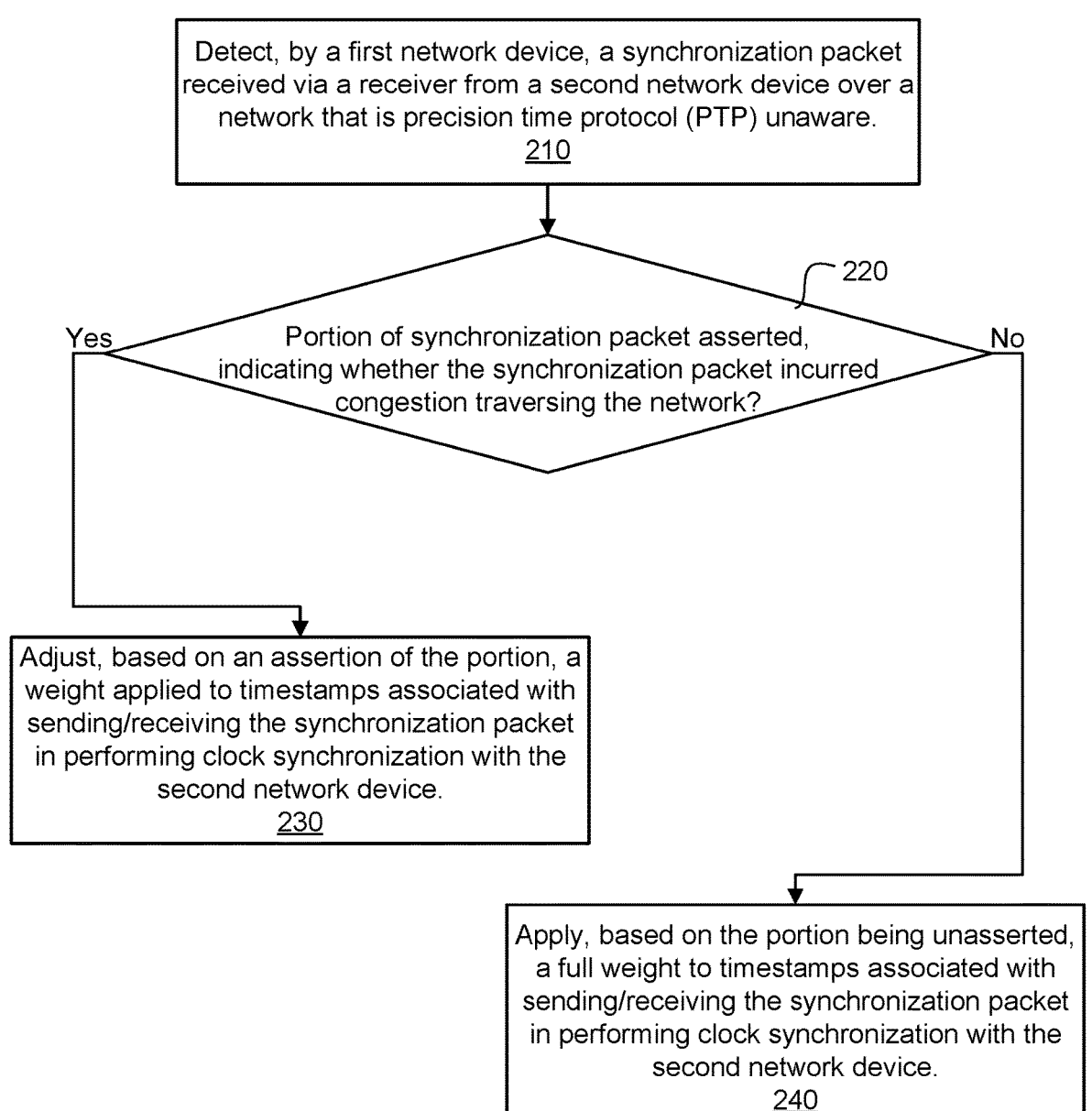

200

Detect, by a first network device, a synchronization packet received via a receiver from a second network device over a network that is precision time protocol (PTP) unaware.
210

220

Portion of synchronization packet asserted, indicating whether the synchronization packet incurred congestion traversing the network?

Yes                                                                                                    No

Adjust, based on an assertion of the portion, a weight applied to timestamps associated with sending/receiving the synchronization packet in performing clock synchronization with the second network device.
230

Apply, based on the portion being unasserted, a full weight to timestamps associated with sending/receiving the synchronization packet in performing clock synchronization with the second network device.
240

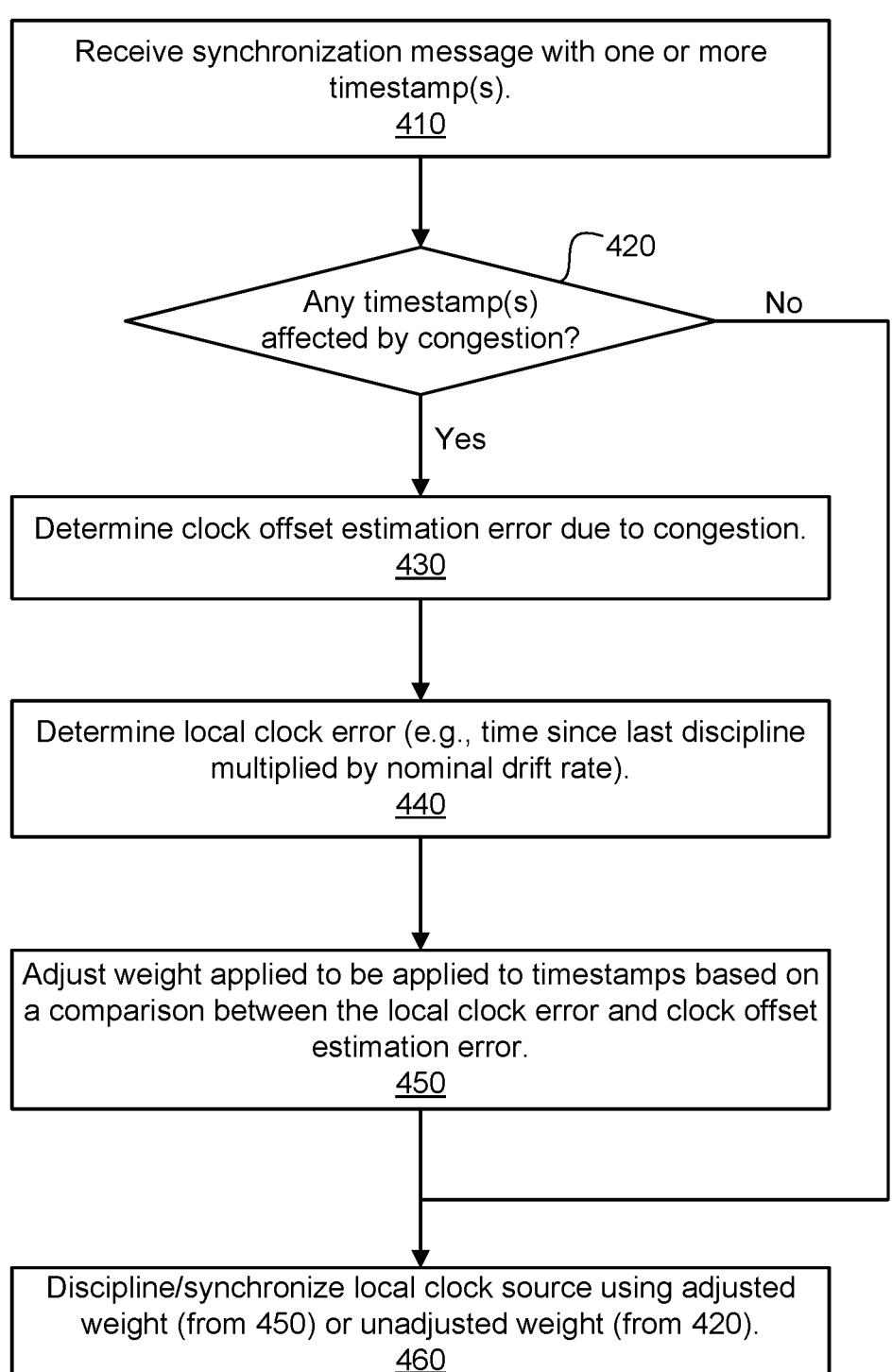

Receive synchronization message with one or more timestamp(s).
410

420
Any timestamp(s) affected by congestion?     No

Yes

Determine clock offset estimation error due to congestion.
430

Determine local clock error (e.g., time since last discipline multiplied by nominal drift rate).
440

Adjust weight applied to be applied to timestamps based on a comparison between the local clock error and clock offset estimation error.
450

Discipline/synchronize local clock source using adjusted weight (from 450) or unadjusted weight (from 420).
460

FIG. 4

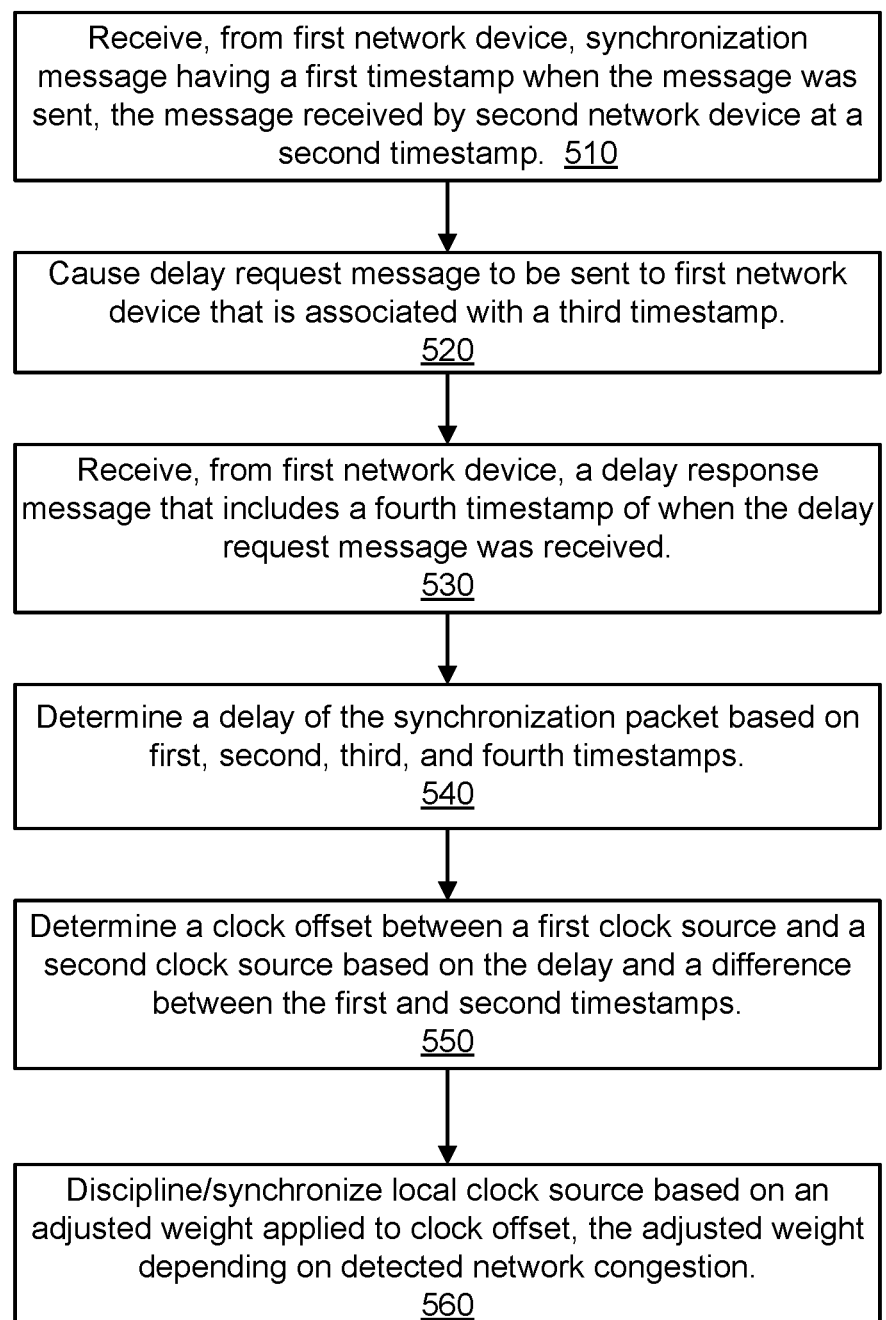

500

Receive, from first network device, synchronization message having a first timestamp when the message was sent, the message received by second network device at a second timestamp. 510

Cause delay request message to be sent to first network device that is associated with a third timestamp. 520

Receive, from first network device, a delay response message that includes a fourth timestamp of when the delay request message was received. 530

Determine a delay of the synchronization packet based on first, second, third, and fourth timestamps. 540

Determine a clock offset between a first clock source and a second clock source based on the delay and a difference between the first and second timestamps. 550

Discipline/synchronize local clock source based on an adjusted weight applied to clock offset, the adjusted weight depending on detected network congestion. 560

FIG. 5

CLOCK SYNCHRONIZATION BETWEEN NETWORKED DEVICES BASED ON PACKET CONGESTION INFORMATION

TECHNICAL FIELD

At least one embodiment pertains to processing resources used to perform and facilitate network communication. For example, at least one embodiment pertains to technology for clock synchronization between networked devices based on packet congestion information.

BACKGROUND

Network devices (e.g., switches, routers, hubs, endpoints, and the like) operate within a network that either fully supports precision time protocol (PTP), e.g., IEEE 1588, or does not fully support PTP. A network that is PTP "aware" is built upon networked communication devices that can synchronize clocks throughout the network. If a local area network (LAN) is PTP aware, for example, the LAN can achieve clock accuracy in the sub-microsecond range, making the LAN suitable for measurement and control systems. PTP is employed to synchronize financial transactions, mobile phone tower transmissions, sub-sea acoustic arrays, and networks that require precise timing but lack access to satellite navigation signals. Many networks are considered PTP-unaware, however, and therefore do not have access to full timing support, resulting in significant challenges in reliably synchronizing clocks.

BRIEF DESCRIPTION OF DRAWINGS

Various embodiments in accordance with the present disclosure will be described with reference to the drawings, in which:

FIG. 2 is a flow diagram of a method for synchronizing clocks between network devices based on packet congestion information in accordance with at least some embodiments;

FIG. 4 is a flow diagram of a method for synchronizing clocks between network devices based on an adjusted weight applied to timestamps based on local clock error and clock offset estimation error, in accordance with at least some embodiments; and FIG. 5 is a flow diagram of a method for synchronizing clocks based on the packets and timestamps sent back and forth between a leader network device and a follower network device, as illustrated in FIG. 2, in accordance with at least some embodiments.

DETAILED DESCRIPTION

Figure 1:
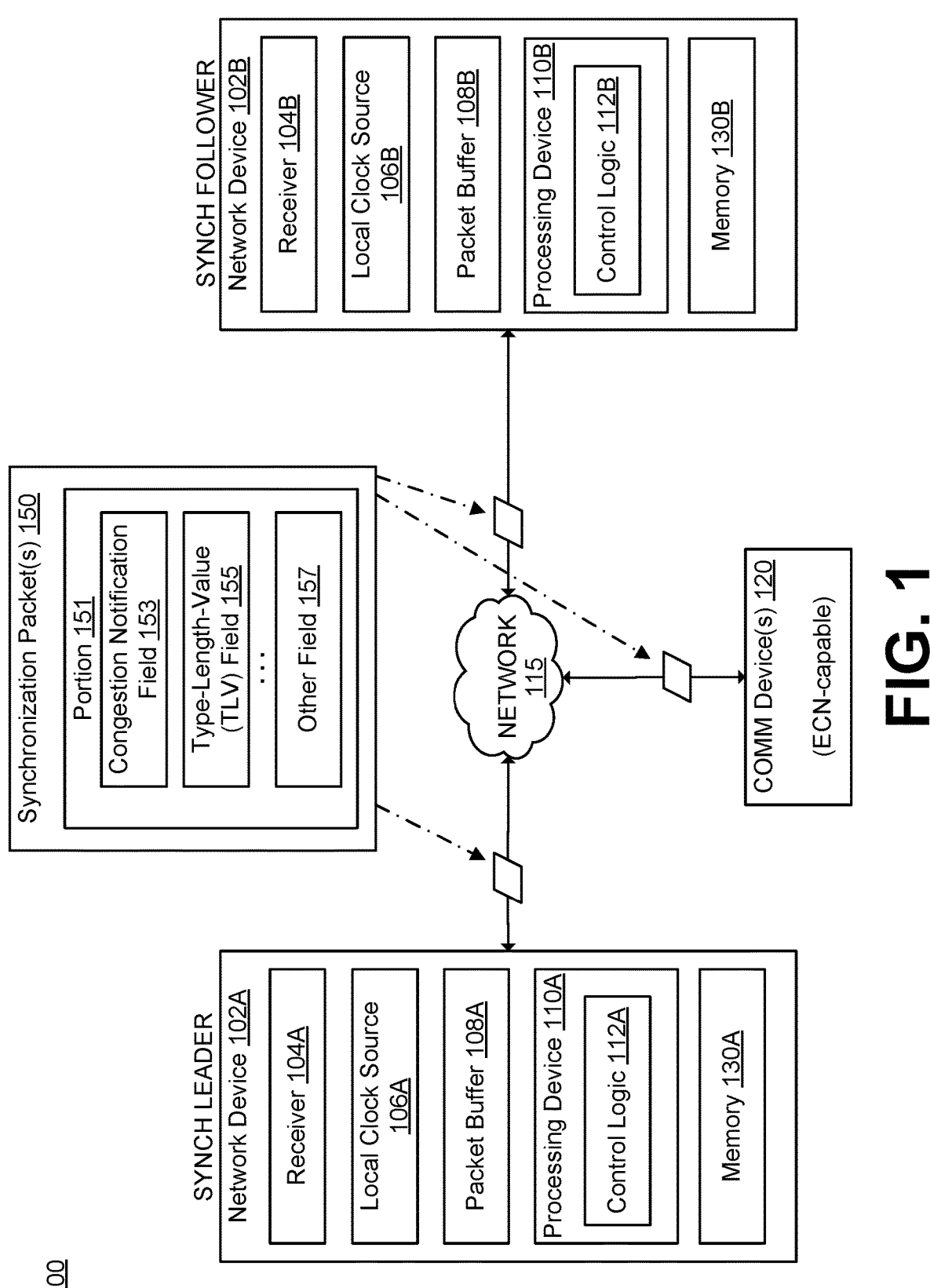
FIG. 1 is a network diagram of an exemplary distributed network system including a pair of communicating network devices between which clock synchronization occurs in accordance with at least some embodiments.

Certain types of special packets can play a role in time-stamp synchronization by which local clock sources of network devices are synchronized. The better able networked devices are at determining the time when packets cross one or more network paths, the better the networked devices can synchronize these local clock sources with each other. The IEEE 1588 (or PTP) protocol captures and sends timestamps with ingress and egress packets between a leader network device and a follower network device, each of which can be any type of network node such as a switch, router, endpoints having network interface adapters, or a mixture thereof.

Delay of packets moving through the network impacts clock synchronization in the network, e.g., packets between leader and follower devices may go through switches and routers that create variable delays in having their own buffers, queues, arbiters, and the like. For example, having more packets ingress into a port than egress out of the port creates a delay where waiting packets are buffered. Furthermore, the path through a network can change over time due to adaptive routing and adaptive switching. This interim delay between leader and follower devices could then become separated by some variable delay (e.g., a dynamic or random delay) in addition to any static delay.

In certain specialized networks, this variable delay can be countered by introducing a "transparent clock," which determines how long a packet resides inside of the switch (or other intermediate nodes) and sends a compensation value like a residence time counter value to the end node so that the end node can compensate for the time the packet spent in the switch (or other network components). Thus, if a packet experiences congestion, the receiver of this packet can correct for the extra propagation time due to network congestion, resulting in generating accurate timestamps. For example, a switch, acting as a transparent clock, can provide a per-packet compensation value to account for the residence time of the packet in the switch. The use of such transparent clock technology is performed in, e.g., telecommunication or radio access networks.

A weakness of this transparent clock approach, however, is the requirement of explicit transparent clock support throughout the entire network, e.g., all network components (switches, routers, hubs) in the network have to support this kind of compensation for residence time. Also, the specialized network needs to have trusted network components that are part of a security domain of the network, e.g., compensation values received from network components are trusted information. Due to the cost of this type of specialized equipment, the deployment of trusted switches (and other trusted network components) in data centers is lagging. Without this equipment, a network has to adapt to what already exists in the network, much of which is not specialized, e.g., legacy equipment not adapted with a transparent clock.

In various embodiments, PTP-based network deployments are classified based on whether all the network components provide support for PTP or not. For example, not all PTP deployments enjoy the privilege of full timing support. These networks, referred to as PTP-unaware networks, pose a significant challenge in reliably synchronizing the clocks, e.g., local clock sources of various network devices or components making up the network. One example of such networks is an InfiniBand (IB) network deployment. An IB deployment is nominally possible to run the PTP protocol over Internet Protocol (IP) v4 over Infini-Band, synchronizing the clocks connected to the network. However, none of the InfiniBand switches available today support transparent clock operation (compensating the PTP timestamps for residence time), which affects the achievable synchronization accuracy due to network congestion. This is not limited to InfiniBand, however. For example, most legacy Ethernet datacenter deployments use switches that are not PTP aware, yielding the same issues. In general, any time and frequency distribution over any PTP-unaware network poses a significant clock synchronization challenge.

There are many PTP-unaware networks deployed already, many of which are not going to be replaced anytime soon, so these challenges will persist in many networks.

Aspects and embodiments of the present disclosure address these and other challenges by employing congestion information within packets to determine or otherwise calculate delays due to congestion and compensate for these delays in clock synchronization. The delays being calculated are often in the dynamic or random delay category of delays through a network, and so can be determined on the fly based on the actual traversal of packets through particular network routes. In disclosed embodiments, the packets are configured to carry congestion indications that can be combined with synchronization protocols (e.g., PTP) in a way that facilitates delay determination. For example, in at least some embodiments, if a network device detects that a packet that would normally be used for synchronization was delayed due to congestion, the network device takes a particular action based on particular criteria, e.g., decides not to use the packet for clock synchronization or assigns the packet a lower weight while performing the clock synchronization. In contrast, in at least some embodiments, if the packet was not delayed due to congestion, the packet and corresponding timestamps can be used as normal to perform clock synchronization.

In some embodiments, for example, a network device includes control logic coupled to a receiver, and the control logic is configured to detect an synchronization packet received via the receiver from a second network device over a network that is PTP unaware. In some embodiments, each synchronization packet is considered capable of carrying congestion information, such as congestion indicators. In these embodiments, the control logic further determines that a portion of the synchronization packet is asserted (e.g., some portion of a particular field), indicating that the synchronization packet has incurred congestion traversing the network. In some embodiments, this asserted portion of the synchronization packet is a bit (e.g., an asserted bit) within a congestion notification field, which, when asserted, indicates the synchronization packet has incurred congestion. In other embodiments, information is provided within a type-length-value (TLV) field that indicates the synchronization packet has incurred congestion.

In these embodiments, the control logic further adjusts, based on an assertion of the portion of the synchronization packet, a weight applied to timestamps associated with sending and receiving the synchronization packet in performing clock synchronization with the second network device. In corresponding embodiments, when the portion is unasserted (e.g., an unasserted bit), the control logic applies, based on the portion being unasserted, a full weight to timestamps associated with sending and receiving the synchronization packet in performing clock synchronization with the second network device.

Advantages of the present disclosure include but are not limited to precise determination of delay of packets flowing through a PTP-unaware network using congestion information or indicators in these packets, e.g., synchronization packets. Thus, corresponding precise local clock source synchronization is made possible using these delay values, despite the network devices participating in a PTP-unaware network. This precise clock synchronization can also be performed without relying on calculating typical heuristics, which rely on end-to-end information with unspecified delay impacting the reliability of such end-to-end information.

Other advantages will be apparent to those skilled in the art of network design and network clock synchronization discussed hereinafter.

FIG. 1 is a network diagram of an exemplary distributed network system 100 including a pair of communicating network devices between which clock synchronization occurs in accordance with at least some embodiments. In illustrated embodiments, the pair of communicating network devices includes a first network device 102A, otherwise referred to as a synchronization leader, and a second network device 102B, otherwise referred to as a synchronization follower. The first network device 102A and second network device 102B are exemplary network components communicating over a PTP-unaware network 115. In some embodiments, the first network device 102A includes a receiver 104A, a local clock source 106A, a packet buffer 108A (or queue), a processing device 110A including control logic 112A, and memory 130A. In some embodiments, the second network device 102B includes a receiver 104B, a local clock source 106B, a packet buffer 108B (or queue), a processing device 110B that includes control logic 112B, and memory 130B.

For simplicity of explanation, the network device referred to herein is often the second network device 102B, and the control logic 112B functions to synchronize the local clock source 106B to the local clock source 106A of the first network device 102A using congestion information in packets. That said, many network devices or network components can variably function in the role of synchronization leader or synchronization follower. Thus, these network devices can be viewed as interchangeable in different discussions herein.

In some embodiments, the processing devices 110A and 110B are central processing units (CPUs), programmed processors, specialized processors such a field-programmable gate array (FPGA), an application-specific integrated circuit (ASIC), or the like. In some embodiments, the processing devices 110A and 110B include the control logic 112A and 112B, respectively. In other embodiments, the control logic 112A is located outside of the processing device 110A and/or the control logic 112B is located outside of the processing device 110B (not illustrated for simplicity). Thus, in some embodiments, the control logic 112A and 112B is instantiated as software (e.g., program code or operations executed out of the memory 130A and 130B, respectively), as hardware (e.g., logic gates), firmware, or a combination thereof.

In various embodiments, the PTP-unaware network 115, which should be understood to include the first and second network devices 102A and 102B, is established with communication devices 120 capable of sending explicit congestion notifications (ECN), e.g., are ECN-capable. Explicit Congestion Notification (ECN) is an extension to the Internet Protocol (IP) and the Transmission Control Protocol (TCP). ECN allows end-to-end notification of network congestion without dropping packets. ECN is an optional feature that may be used between two ECN-enabled endpoints when the underlying network infrastructure also supports ECN.

In at least some embodiments, synchronization packets 150 are transmitted within the PTP-unaware network 115, including between the first network device 102A and the second network device 102B. In these embodiments, the synchronization packets 150 can be understood to be either Ethernet frames or IP packets, which are ECN-capable and thus may carry congestion information, which is relatable to PTP, as will be discussed. Thus, in differing embodiments, the synchronization packets include explicit forward congestion notification (FECN) mechanisms, e.g., which can be supported by InfiniBand, IP (RFC 3168), frame relay, multiprotocol label switching, or DataCenter Bridging, which are listed as potential examples of the technology on which the PTP-unaware network 115 is based.

In various embodiments, each synchronization packet 150 includes a portion 151 that is asserted or otherwise activated as an indicator of congestion. In differing embodiments, the portion 151 of the synchronization packets 150 includes a congestion notification field 153, a type-length-value (TLV) field 155, or other field 157 configured with a FECN-based congestion indicator. For example, a bit or multiple bits of the congestion notification field 153 can be asserted (e.g., become an asserted bit), or particular congestion information can be stored in the TLV field 155 that indicates the synchronization packet has incurred congestion. In some embodiments, other information or data is storable in the other field 157 as a congestion indicator, e.g., potentially adding monitoring tracing events within the other field 157.

In various embodiments, FECN includes network relays (e.g., the communication devices 120 such as switches, routers, hubs, and the like) detecting congestion and changing a field in the header of a packet (e.g., an synchronization packet) if the packet experienced congestion. Sometimes, these relay nodes only add the FECN mark to the packets which caused the congestion (e.g., as the source of congestion), but the relay nodes can be configured to also mark packets that are the victim of congestion, which is what the present disclosure primarily relies on to communicate congestion information between network devices or components. Once the FECN field has been set, the field is not reset by subsequent relay nodes. A receiving network device can inspect the field in the received packet and react to any indication of congestion.

FIG. 2 is a flow diagram of a method 200 for synchronizing clocks between network devices based on packet congestion information in accordance with at least some embodiments. The method 200 can be performed by processing logic comprising hardware, software, firmware, or any combination thereof. In at least one embodiment, the method 200 is performed by a network device such as the second network device 102B. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 210, the processing logic of the second network device 102B detects a synchronization packet received via a receiver from the first network device 102A over a network that is precision time protocol (PTP) unaware, e.g., the PTP-unaware network 115.

At operation 220, the processing logic determines whether a portion of the synchronization packet is asserted (e.g., some portion of a particular field is asserted as discussed with reference to the synchronization packet 150 of FIG. 1), indicating that the synchronization packet has incurred congestion traversing the network (if asserted) or did not incur congestion traversing the network (if not asserted).

At operation 230, the processing logic adjusts, based on an assertion of the portion in operation 220, a weight applied to timestamps associated with sending and receiving the synchronization packet in performing clock synchronization with the second network device. In some embodiments, this weight is reduced up to and including zero ("0") if the decision is to not use timestamps associated with the synchronization packet due to the congestion. Choosing a level of weight applied to the timestamps will be discussed in more detail.

At operation 240, the processing logic applies, based on the portion being unasserted at operation 220 (e.g., an unasserted bit), a full weight to timestamps associated with sending and receiving the synchronization packet in performing clock synchronization with the second network device. In this situation (the portion being unasserted), the synchronization packet indicates there has been no congestion and thus can be given complete confidence in using timestamps associated with the synchronization packet for performing clock synchronization.

Figure 3:
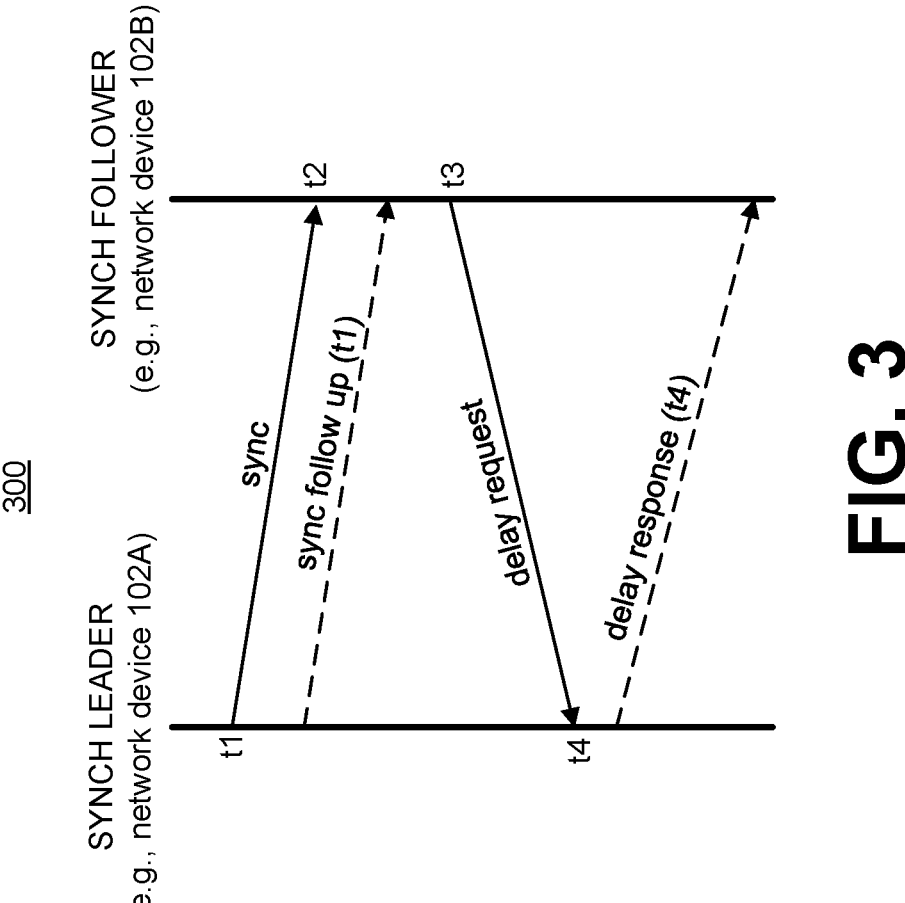
FIG. 3 is a timing diagram illustrating timestamp-based clock synchronization, in accordance with at least some embodiments.

FIG. 3 is a timing diagram illustrating timestamp-based clock synchronization, in accordance with at least some embodiments. In some embodiments, the synchronization leader is the first network device 102A, and the synchronization follower is the second network device 102B for purposes of explanation (although these roles could be reversed).

According to some embodiments, for packets sent from the synchronization leader (first network device 102A) to the synchronization follower (second network device 102B), the first network device 102A sends real-time synchronization packets, also referred to herein as synchronization packets or synchronization messages, with a FECN bit unset (e.g., the portion 151 being unset). In these embodiments, if a synchronization packet experiences congestion in the network, a relay node that detected the congestion sets the FECN bit. In some embodiments, the relay node is any one of the communication devices 120 participating in the PTP-unaware network 115. In these embodiments, the second network device 102B receives the synchronization packet, inspects the FECN field, and decides whether to use the timestamps related to the synchronization packet in the clock synchronization algorithm and/or with what weight to use the timestamps.

According to some embodiments, for packets sent from the synchronization follower (second network device 102B) to the synchronization leader (first network device 102A), the second network device 102B sends real-time synchronization packets, also referred to herein as synchronization packets or delay request messages, with the FECN bit unset (e.g., the portion 151 being unset). In these embodiments, if the synchronization packet experiences congestion in the network, a relay node that detected the congestion sets the FECN bit. In some embodiments, the relay node is any one of the communication devices 120 participating in the PTP-unaware network 115. In these embodiments, the first network device 102 receives the synchronization packet, inspects the FECN field, and communicates the presence of the set bit (e.g., set portion 151) to the second network device 102B so that the second network device 102B can decide whether to use the timestamps related to this synchronization packet in the clock synchronization algorithm or with what weight to use the timestamps.

With additional reference to FIG. 3, in an exemplary embodiment, the first network device 102A sends a first synchronization packet at time t1, and the synchronization packet is received by the second network device 102B at time t2. In some embodiments, following the transmission of the synchronization packet, the first network device 102A can also send a follow-up message (see dashed line for optional operation) that includes timestamp t1 so that the second network device 102B knows both t1 and t2 timestamps. According to some embodiments, the second network device 102B thereafter sends a delay request message at time t3. In response, in some embodiments, the first network device 102A can also send a delay response message that includes the time t4 that the delay request message was received. In this way, the second network device 102B now knows both times t3 and t4 timestamps. In some embodiments, the synchronization follower knows either or both of t1/t2 and t3/t4 depending on which types of synchronization packets are sent at any given time.

In various embodiments, the synchronization follower (e.g., the control logic 112B of the second network device 102B) uses the timestamps (t1, t2, t3, t4) captured at the ingress and egress of these synchronization packets to calculate the delay (e.g., a one-way delay (OWD)) of any packet between the synchronization leader (e.g., the first network device 102A) and the second network device 102B, as per Equation (1). The control logic 112B can then use the delay to also determine the clock offset of the second network device 102B according to Equation (2).

$$\text{delay} = \frac{t4 - t1 - (t3 - t2)}{2} \quad (1)$$

$$\text{clock offset} = t2 - t1 - \text{delay} \quad (2)$$

Once the clock offset is known, the second network device 102B can adjust (e.g., discipline) its local clock source 106B by the clock offset to synchronize the local clock source 106B to the local clock source 106A of the first network device 102A. As the clock offset changes over time, this synchronization of the local clock sources can be repeated (in either direction) to keep the first and second network devices 102A and 102B time synchronized.

In at least some embodiments, if either of the synchronization packets (synchronization message or delay request message) experiences delay, the delay and the clock offset calculations may be affected by an unknown queuing delay. Using FECN-based information as per Equations (1) and (2), or by other means, for example, the second network device 102B can identify which packets were affected by the queuing delay and can determine to not use timestamps associated with those packets in the clock synchronization algorithm or to use the timestamps with a reduced weight. In these embodiments, the second network device 102B determines not to use the timestamps for synchronization when expecting the local clock source 106B to still be synchronized to the local clock source 106A of the leader device. In other words, having a reliable measurement for clock synchronization less than a particular time period ago, the second network device 102B may prefer not to use congestion-impacted packets for synchronization. Otherwise, when outside of that particular time period, the second network device 102B may prefer to use weighted versions of the timestamps of the congestion-impacted packets, as congestion-impacted information is better than no information.

For example, in some embodiments, the control logic 112B estimates a local clock error based on a period of time since a last synchronization of the local clock source 106B and a known accuracy metric value of the local clock source 106B. The known accuracy metric value, in some embodiments, is a known local drift rate of the local clock source 106B, e.g., some quality metric of the local oscillator of the local clock source 106B. In some embodiments, the accuracy metric value is directly measured from the local clock source 106B. In these embodiments, the control logic 112B applies no weight to the timestamps in synchronizing the local clock source 106B in response to determining that the local clock error is less than or equal to a maximum congestion error for the network. Further, in at least some embodiments, the control logic 112B reduces the weight applied to the timestamps in synchronizing the local clock source 106B in response to the local clock error being greater than the maximum congestion error for the network. In these embodiments, the maximum congestion error is calculated as a difference in transmission and reception timestamps for a particular synchronization packet minus a delay that has been calculated between the network devices 102A and 102B, for example. In some embodiments, the maximum congestion error is directly measured rather than calculated and can be updated from time to time.

FIG. 4 is a flow diagram of a method 400 for synchronizing clocks between network devices based on an adjusted weight applied to timestamps based on local clock error and clock offset estimation error, in accordance with at least some embodiments. The method 400 can be performed by processing logic comprising hardware, software, firmware, or any combination thereof. In at least one embodiment, the method 400 is performed by a network device such as the second network device 102B (FIG. 1). Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 410, the processing logic receives a synchronization message with one or more timestamps, as was discussed with reference to FIG. 3.

At operation 420, the processing logic determines whether any of the timestamp(s) have been affected by congestion. In some embodiments, to do so, the processing logic inspects the portion 151 of one or more synchronization packets 150 associated with the timestamp(s) to determine whether the timestamps have been affected by congestion, as previously discussed.

At operation 460, the processing logic, in response to determining at operation 420 that the timestamp(s) have not been affected by congestion, discipline (e.g., synchronize) the local clock source 106B using an unadjusted weight. In these embodiments, the unadjusted weight may be a full weight applied to the timestamp(s) to determine any normal delay and perform synchronization normally.

At operation 430, the processing logic, in response to determining at operation 420 that the timestamp(s) have been affected by congestion, determines a clock offset estimation error due to the congestion. In some embodiments, the processing device determines the clock offset estimation error as per Equations (1) and (2), discussed with reference to FIG. 3. In this way, the clock offset estimation is an estimate of how congestion delays have affected any previously estimated clock offset. In some embodiments, this estimation includes comparing a previously determined delay with newly determined delays. In some embodiments, the previously determined delay is either measured or based on an estimation of error that is typical when the packets experience congestion in a particular network or portion of a network, e.g., a fixed period of microseconds.

At operation 440, the processing logic determines a local clock error, e.g., a time period since last disciplining or synchronizing the local clock source 106B multiplied by a nominal drift rate for the local clock source 106B.

At operation 450, the processing logic adjusts a weight to be applied to the one or more timestamp(s) based on a comparison between the local clock error and the clock offset estimation error. For example, if the clock offset estimation error is greater than the local clock error, then the weight is adjusted; otherwise, the weight is not adjusted. In this way, a decision can be made whether to adjust the weight applied to the timestamp(s) based on whether a magnitude of the calculated clock offset estimation error is large enough to impact the local clock source 106B in view of the magnitude of the local clock error.

At operation 460, the processing logic, in response to having determined the adjusted weight for the timestamp(s) at operation 450, disciplines or synchronizes the local clock source 106B by first applying the adjusted weight to the one or more timestamp(s). For example, in some embodiments, the adjusted weight is applied to the timestamp(s) used to calculate the clock offset as per Equations (1) and (2), which is then used to synchronize the local clock source 106B.

FIG. 5 is a flow diagram of a method 500 for synchronizing clocks based on the packets and timestamps sent back and forth between a leader network device and a follower network device, as illustrated in FIG. 2, in accordance with at least some embodiments. The method 500 can be performed by processing logic comprising hardware, software, firmware, or any combination thereof. In at least one embodiment, the method 500 is performed by a network device such as the second network device 102B (FIG. 1). Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 510, the processing logic receives, from the first network device 102A, a synchronization message having a first timestamp (t1) when the synchronization message was sent. In this embodiment, the synchronization message was received by the second network device 102B at a second timestamp (t2).

At operation 520, the processing logic causes a delay request message to be sent to the first network device 102A that is associated with a third timestamp of the first clock source 106B.

At operation 530, the processing logic receives, from the first network device 102A, a delay response message that includes a fourth timestamp of when the delay request message was received.

At operation 540, the processing logic determines a delay of the synchronization packet between the first network device 102A and the second network device 102B based on the first, second, third, and fourth timestamps (e.g., t1, t2, t3, and t4).

At operation 550, the processing logic determines a clock offset value between the first clock source and the second clock source based on the delay and a difference between the first and second timestamps. Determining the clock offset value was discussed with reference to Equations (1) and (2).

At operation 560, the processing logic disciplines or synchronizes the first clock source to the second clock source based on the adjusted weight applied to the clock offset value, which itself depends on the values of the first, second, third, and fourth timestamps. Thus, the adjusted weight may also instead be applied to the first, second, third, and fourth timestamps. In these embodiments, the adjusted weight depends on detected network congestion in related synchronization packets. In some embodiments, if there was no indication of congestion detected, however, the processing logic synchronizes the second clock source 106B to the first clock source 106A based on the full weight (e.g., "1.0") applied to the clock offset value.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range unless otherwise indicated herein, and each separate value is incorporated into the specification as if it were individually recited herein. In at least one embodiment, the use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously, or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality and are intended to be within the scope of this disclosure. Furthermore, although specific distributions of responsibilities may be defined above for purposes of description, various functions and responsibilities might be distributed and divided in different ways, depending on the circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A network device comprising:
control logic coupled to a receiver and configured to:
detect a synchronization packet received via the receiver from a second network device over a network that is precision time protocol (PTP) unaware;
determine that a bit of a congestion notification field of the synchronization packet is asserted, indicating that the synchronization packet has incurred congestion traversing the network; and
reduce, based on an assertion of the bit, a weight applied to timestamps associated with sending and receiving the synchronization packet in performing clock synchronization with the second network device.

2. The network device of claim 1, wherein the network is established with communication devices capable of sending explicit congestion notifications.

3. The network device of claim 1, wherein the synchronization packet is one of a synchronization message received from the second network device or a delay response message received from the second network device in response to sending a delay request message to the second network device.

4. The network device of claim 1, wherein the synchronization packet is a delay response message received from the second network device in response to sending a delay request message to the second network device, and wherein the delay response message includes one of:
an asserted bit within a congestion notification field that indicates the delay request message has incurred congestion; or
information within a type-length-value (TLV) field that indicates the delay request message has incurred congestion.

5. The network device of claim 1, further comprising a local clock source coupled to the control logic, wherein the control logic is further to:
estimate a local clock error based on a period of time since a last synchronization of the local clock source and a known accuracy metric value of the local clock source; and
apply no weight to the timestamps in synchronizing the local clock source in response to determining that the local clock error is less than or equal to a maximum congestion error for the network.

6. The network device of claim 1, further comprising a local clock source coupled to the control logic, wherein the control logic is further to:
estimate a local clock error based on a period of time since a last synchronization of the local clock source and a known accuracy metric value of the local clock source; and
reduce the weight applied to the timestamps in synchronizing the local clock source in response to the local clock error being greater than a maximum congestion error for the network.

7. The network device of claim 1, wherein the synchronization packet is a synchronization message, and the timestamps are a first timestamp of a second clock source of a second network device and a second timestamp of a first clock source of the network device, the control logic further to:

cause a delay request message to be sent to the second network device that is associated with a third timestamp of the first clock source;
receive, from the second network device, a delay response message that includes a fourth timestamp of when the delay request message was received;
determine a delay of the synchronization packet between the network device and the second network device based on the first, second, third, and fourth timestamps;
determine a clock offset value between the first clock source and the second clock source based on the delay and a difference between the first and second timestamps; and
synchronize the first clock source to the second clock source based on the reduced weight applied to one of the clock offset value or the first, second, third, and fourth timestamps.

8. A method comprising:
detecting, by a first network device, a synchronization packet received via a receiver from a second network device over a network that is precision time protocol (PTP) unaware;
determining that a bit of the synchronization packet is asserted, indicating that the synchronization packet has incurred congestion traversing the network; and
adjusting, based on an assertion of the bit, a weight applied to timestamps associated with sending and receiving the synchronization packet in performing clock synchronization with the second network device, wherein the synchronization packet is a delay response message received from the second network device in response to sending a delay request message to the second network device, and wherein the bit of the delay response message includes one of:
an asserted bit within a congestion notification field that indicates the delay request message has incurred congestion; or
information within a type-length-value (TLV) field that indicates the delay request message has incurred congestion.

9. The method of claim 8, further comprising establishing the network with communication devices capable of sending explicit congestion notifications.

10. The method of claim 8, wherein the synchronization packet is one of a synchronization message received from the second network device or a delay response message received from the second network device in response to sending a delay request message to the second network device.

11. The method of claim 8, further comprising:
estimating a local clock error based on a period of time since a last synchronization of a local clock source and a known accuracy metric value of the local clock source of the first network device; and
applying no weight to the timestamps in synchronizing the local clock source in response to determining that the local clock error is less than or equal to a maximum congestion error for the network.

12. The method of claim 8, further comprising:
estimating a local clock error based on a period of time since a last synchronization of a local clock source and a known accuracy metric value of the local clock source of the first network device; and
applying the adjusted weight to the timestamps in synchronizing the local clock source in response to the local clock error being greater than a maximum congestion error for the network.

13. The method of claim 8, wherein the synchronization packet is a synchronization message, and the timestamps are a first timestamp of a second clock source of the second network device and a second timestamp of a first clock source of the first network device, the method further comprising:

causing a delay request message to be sent to the second network device that is associated with a third timestamp of the first clock source;

receiving, from the second network device, a delay response message that includes a fourth timestamp of when the delay request message was received;

determine a delay of the synchronization packet between the network device and the second network device based on the first, second, third, and fourth timestamps;

determining a clock offset estimation error based on the delay;

determining a local clock error of the first clock source;

adjusting the weight applied to the first, second, third, and fourth timestamps based on a comparison between the clock offset estimation error and the local clock error; and synchronize the first clock source to the second clock source using the adjusted weight applied to the first, second, third, and fourth timestamps.

14. A method comprising:

detecting, by a first network device, a synchronization packet received via a receiver from a second network device over a network that is precision time protocol (PTP) unaware;

determining that a bit of the synchronization packet is unasserted, indicating the synchronization packet did not incur congestion traversing the network; and applying, based on the bit being unasserted, a full weight to timestamps associated with sending and receiving the synchronization packet in performing clock synchronization with the second network device, wherein the synchronization packet is a delay response message received from the second network device in response to sending a delay request message to the second network device, and wherein the bit of the delay response message includes one of:

an unasserted bit within a congestion notification field that indicates the delay request message has not incurred congestion; or information within a type-length-value (TLV) field that indicates the delay request message has not incurred congestion.

15. The method of claim 14, wherein the synchronization packet is one of a synchronization message received from the second network device or a delay response message received from the second network device in response to sending a delay request message to the second network device.

16. The method of claim 14, wherein the synchronization packet is a synchronization message, and the timestamps are a first timestamp of a second clock source of the second network device and a second timestamp of a first clock source of the first network device, the method further comprising causing a delay request message to be sent to the second network device that is associated with a third timestamp of the first clock source; receiving, from the second network device, a delay response message that includes a fourth timestamp of when the delay request message was received; determining a delay of the synchronization packet between the first network device and the second network device based on the first, second, third, and fourth timestamps; determining a clock offset value between the first clock source and the second clock source based on the delay and a difference between the first and second timestamps; and synchronizing the first clock source to the second clock source based on the full weight applied to one of the clock offset value or the first, second, third, and fourth timestamps.

17. A network device comprising:

control logic coupled to a receiver and configured to:

detect a synchronization packet received via the receiver from a second network device over a network that is precision time protocol (PTP) unaware;

determine that a bit of the synchronization packet is asserted, indicating that the synchronization packet has incurred congestion traversing the network; and adjust, based on an assertion of the bit, a weight applied to timestamps associated with sending and receiving the synchronization packet in performing clock synchronization with the second network device; and a local clock source coupled to the control logic, wherein the control logic is further to:

estimate a local clock error based on a period of time since a last synchronization of the local clock source and a known accuracy metric value of the local clock source; and one of apply no weight or reduce the weight applied to the timestamps in synchronizing the local clock source based on the local clock error.

18. The network device of claim 17, wherein to apply no weight to the timestamps is in response to determining that the local clock error is less than or equal to a maximum congestion error for the network.

19. The network device of claim 17, wherein to reduce the weight applied to the timestamps is in response to the local clock error being greater than a maximum congestion error for the network.

20. A network device comprising:

control logic coupled to a receiver and configured to:

detect a synchronization packet received via the receiver from a second network device over a network that is precision time protocol (PTP) unaware;

determine that a bit of the synchronization packet is asserted, indicating that the synchronization packet has incurred congestion traversing the network; and adjust, based on an assertion of the bit, a weight applied to timestamps associated with sending and receiving the synchronization packet in performing clock synchronization with the second network device, wherein the synchronization packet is a synchronization message, and the timestamps are a first timestamp of a second clock source of the second network device and a second timestamp of a first clock source of the network device, the control logic further to:

cause a delay request message to be sent to the second network device that is associated with a third timestamp of the first clock source;

receive, from the second network device, a delay response message that includes a fourth timestamp of when the delay request message was received;

determine a delay of the synchronization packet between the network device and the second network device based on the first, second, third, and fourth timestamps;

determine a clock offset value between the first clock source and the second clock source based on the delay and a difference between the first and second timestamps; and synchronize the first clock source to the second clock source based on the adjusted weight applied to one of the clock offset value or the first, second, third, and fourth timestamps.

\* \* \* \* \*